(12) United States Patent
Abe (10) Patent No.: US 9,118,079 B2
(45) Date of Patent: Aug. 25, 2015

(54) NONAQUEOUS ELECTROLYTIC SOLUTION SECONDARY BATTERY, CURRENT COLLECTOR AND VEHICLE

(71) Applicant: Takeshi Abe, Toyota (JP)

(72) Inventor: Takeshi Abe, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 2 days.

(21) Appl. No.: 14/102,949

(22) Filed: Dec. 11, 2013

(65) Prior Publication Data

US 2014/0170452 A1 Jun. 19, 2014

(30) Foreign Application Priority Data

Dec. 17, 2012 (JP) ................................ 2012-274655

(51) Int. Cl.

| | |
|---|---|
| H01M 4/00 | (2006.01) |
| H01M 4/66 | (2006.01) |
| H01M 4/131 | (2010.01) |
| H01M 4/505 | (2010.01) |
| H01M 4/525 | (2010.01) |
| H01M 4/64 | (2006.01) |
| H01M 10/0525 | (2010.01) |
| H01M 10/0587 | (2010.01) |

(52) U.S. Cl.
CPC ............. *H01M 4/667* (2013.01); *H01M 4/131* (2013.01); *H01M 4/661* (2013.01); *H01M 4/505* (2013.01); *H01M 4/525* (2013.01); *H01M 4/64* (2013.01); *H01M 10/0525* (2013.01); *H01M 10/0587* (2013.01); *H01M 2250/20* (2013.01); *Y02E 60/122* (2013.01); *Y02T 10/7011* (2013.01); *Y02T 90/32* (2013.01)

(58) Field of Classification Search
CPC ................................ H01M 4/64; H01M 4/661
See application file for complete search history.

(56) References Cited

U.S. PATENT DOCUMENTS

2006/0269840 A1 11/2006 Oogami et al.
2008/0241689 A1* 10/2008 Takami et al. ................ 429/220

FOREIGN PATENT DOCUMENTS

| JP | H06-70159 U | 9/1994 |
|---|---|---|
| JP | H06-267542 A | 9/1994 |
| JP | H10-270048 A | 10/1998 |
| JP | H11-167929 A | 6/1999 |
| JP | 2005-135634 A | 5/2005 |
| JP | A-2006-324143 | 11/2006 |
| JP | 2009-009778 A | 1/2009 |
| JP | A-2012-21205 | 2/2012 |
| JP | A-2012-136736 | 7/2012 |

* cited by examiner

*Primary Examiner* — Jane Rhee
(74) *Attorney, Agent, or Firm* — Oliff PLC

(57) ABSTRACT

A nonaqueous electrolytic solution secondary battery includes an electrode body that contains a positive electrode and a negative electrode. An upper limit operating potential of the positive electrode is 4.5 V or more based on metallic lithium. The positive electrode includes a current collector and an active material layer formed on the current collector. The current collector includes a base material and a surface layer disposed on a surface of the base material. The surface layer is disposed at least in a region where the active material layer is not formed on the surface of the base material. The surface layer is formed of an aluminum material having an aluminum content of 99.85% by mass or more. The base material is formed of a conductive material having strength larger than strength of the surface layer.

12 Claims, 4 Drawing Sheets

NONAQUEOUS ELECTROLYTIC SOLUTION SECONDARY BATTERY, CURRENT COLLECTOR AND VEHICLE

INCORPORATION BY REFERENCE

The disclosure of Japanese Patent Application No. 2012-274655 filed on Dec. 17, 2012 including the specification, drawings and abstract is incorporated herein by reference in its entirety.

BACKGROUND OF THE INVENTION

1. Field of the Invention

The invention relates to a nonaqueous electrolytic solution secondary battery, a current collector and a vehicle. In more detail, the invention relates to a nonaqueous electrolytic solution secondary battery applicable to an on-vehicle power source, and a current collector that can be used in the secondary battery.

2. Description of Related Art

A secondary battery is used as an on-vehicle power source that uses electricity as a driving source, or as a power source that is mounted on personal computers, portable terminals and other electric products. In particular, a lithium secondary battery and other nonaqueous electrolytic solution secondary batteries, which have light weight and can obtain high energy density, are preferable as an on-vehicle high output power source for electric vehicles and hybrid vehicles. In such a nonaqueous electrolytic solution secondary battery, a positive electrode includes a current collector and an active material layer, and as the current collector, typically Aluminum (Al) or an Al alloy is used. For example, in Japanese Patent Application Publication No. 2012-021205 (JP 2012-021205 A), with an object of combining the mechanical characteristics and low electric resistance performance, a current collector made of an Al foil in which Al content is 98% by mass or more and Fe and Cu are contained at specified ratios is proposed. In Japanese Patent Application Publication No. 2012-136736 (JP 2012-136736 A), a technique where in order to provide a current collector that is excellent in the tensile strength, Al plating is applied on a surface of a metal foil such as a Ni foil is proposed. In Japanese Patent Application Publication No. 2006-324143 (JP 2006-324143 A), a positive electrode terminal that is electrically connected to a positive electrode is disclosed. According to the positive electrode terminal, a part that is placed inside a battery is formed of high purity Al and other part is formed of a material having strength higher than that of the high purity Al, and it is intended to lengthen a life of the battery and to improve vibration resistance thereof thereby.

Incidentally, the nonaqueous electrolytic solution secondary battery described above is required to further improve performance such as high energy density. As one measure for realizing the high energy density, a use of a positive electrode active material that shows a higher operating potential is under study. However, in a nonaqueous electrolytic solution secondary battery that uses a positive electrode active material that shows an operating potential higher than 4.5 V based on metallic lithium (hereinafter, a potential based on metallic lithium is represented as "vs. $Li/Li^+$" in some cases), when charge/discharge is repeated at a high potential, a battery capacity tends to largely decrease compared with a secondary battery of related art. It was clarified from a study of the present inventors that a degree of the decreasing tendency can vary depending on a positive electrode current collector. For example, in the secondary battery of concerned technology such as mentioned above, characteristics demanded on the current collector were mainly to combine conductivity and strength. According to the secondary battery of the related art described above, on a surface of Al or an Al alloy that mainly forms a current collector material, a coat of $Al_2O_3$ or $AlF_3$ is formed. Since the coat is stable for a nonaqueous electrolytic solution, specified corrosion resistance is exerted. From this, in a use aspect that is assumed in a secondary battery that operates at a potential of the related art (typically, 4.2 V (vs. $Li/Li^+$)), it was not considered that Al is eluted from the current collector and the battery capacity is decreased. For example, in Japanese Patent Application Publication No. 2012-021205 (JP 2012-021205 A) and Japanese Patent Application Publication No. 2012-136736 (JP 2012-136736 A), the related arts are disclosed.

However, in a nonaqueous electrolytic solution secondary battery that uses a positive electrode active material showing an operating potential higher than 4.5 V (vs. $Li/Li^+$), depending on a use aspect, in spite of existence of the coat on a surface of the Al current collector, Al is eluted from the current collector, the eluted Al precipitates on the negative electrode and battery resistance increases, and the battery capacity may be decreased thereby.

SUMMARY OF THE INVENTION

The present inventors, after intensive study of the phenomenon, found that when a content of Al is increased on a surface of a current collector, an excellent coat that can prevent a battery capacity from decreasing due to high potential charge/discharge can be formed on a surface of the current collector.

The invention provides, in a secondary battery that can perform high potential charge/discharge of 4.5 V or more, a nonaqueous electrolytic solution secondary battery in which battery capacity is prevented from decreasing and a current collector has sufficient strength. Further, the invention further provides a current collector that is used in such a secondary battery or a vehicle that uses such a secondary battery.

According to a first aspect of the invention, a nonaqueous electrolytic solution secondary battery is provided. The secondary battery includes an electrode body that contains a positive electrode and a negative electrode. The upper-limit operating potential of the positive electrode is 4.5 V or more based on metallic lithium. The positive electrode includes a current collector and an active material layer formed on the current collector. The current collector has a base material and a surface layer formed on a surface of the base material. The surface layer is disposed, in the surface layer of the base material, at least in a region where the active material layer is not formed. The surface layer is formed of an aluminum material having an aluminum content of 99.85% by mass or more. The base material is formed of a conductive material having the strength larger than that of the surface layer.

According to such a structure, since Al is present at a content of 99.85% by mass or more on a surface of the current collector, an excellent coat can be formed on a surface of the current collector. The coat prevent Al from eluding from the current collector due to high potential charge/discharge of 4.5 V (vs. $Li/Li^+$) or more. As a result, in a secondary battery that can perform the high potential charge/discharge such as described above, an increase in the battery resistance is suppressed and a decrease in the battery capacity can be suppressed. Further, since a high strength material is adopted in the base material in the above structure, it is less likely that, during preparation of the electrode body or during formation of the battery, the current collector is broken. According to the above structure, a decrease in a battery capacity that can be caused by repeating charge/discharge under high potential condition more than a specified potential can be suppressed by a coat obtained by increasing an Al content of a surface of the current collector.

In the first aspect of the invention, a conductive material that forms the base material may be an aluminum material. Further, an aluminum material that forms the base material may have an aluminum content lower than the aluminum material that forms the surface layer. When the aluminum content in the base material is reduced, strength desirable as the current collector for a secondary battery can preferably be realized.

In the first aspect of the invention, the current collector may be a clad material. When the clad material is used as the current collector material, while suppressing a decrease in the battery capacity, strength improvement in the current collector can be realized at a high level.

In the first aspect of the invention, the positive electrode may contain a lithium transition metal composite oxide having a spinel structure as a positive electrode active material. The lithium transition metal composite oxide may contain at least nickel and manganese as transition metal elements. Since the positive electrode active material has a high operating potential, a secondary battery formed using the positive electrode active material can be charged up to a high potential. Therefore, a phenomenon in which Al is eluted from the current collector due to high potential charge/discharge, and the eluted Al precipitates on the negative electrode is likely to occur. For a structure that uses the positive electrode active material, an increase in the electric resistance due to suppression of Al elusion, eventually, a decrease in the battery capacity can properly be suppressed.

In the first aspect of the invention, both the positive electrode and the negative electrode may have a sheet form. Further, the electrode body may be a wound electrode body obtained by winding the positive electrode and the negative electrode. According to the wound electrode body as described above, for a reason that the larger a curvature becomes as goes toward a winding inner periphery side, a load tends to be applied on the current collector, and the current collector tends to be broken. When the current collector according to the first aspect of the invention, which has specified strength, is applied to the secondary battery like this, a risk of fracture of the current collector can be alleviated while realizing suppression of decrease in the battery capacity.

A second aspect of the invention is a current collector that is used in the positive electrode of which an upper-limit operating potential is 4.5 V or more based on metallic lithium. The current collector includes a base material and a surface layer disposed on a surface of the base material. The surface layer is formed of an aluminum material having an aluminum content of 99.85% by mass or more. The base material is formed of a conductive material having the strength larger than that of the surface layer. In such a structure, an excellent coat is formed on a surface of the current collector and a decrease in the battery capacity due to high potential charge/discharge of 4.5 V (vs. Li/Li$^+$) or more can be suppressed. According to the above structure, since a high strength material is adopted in the base material, a positive electrode current collector for a secondary battery can have enough strength. Therefore, there is less likely that during preparation of the electrode body or during formation of the battery, the current collector is broken.

A third aspect of the invention is a vehicle that includes the nonaqueous electrolytic solution secondary battery according to the first aspect of the invention. In the nonaqueous electrolytic solution secondary battery disclosed here, in addition to be capable of performing charge/discharge at a high potential of 4.5 V (vs. Li/Li$^+$) or more, a decrease in the battery capacity due to such high potential charge/discharge is suppressed. Therefore, by taking advantages of the characteristics, the nonaqueous electrolytic solution secondary battery can preferably be used as a driving power source of vehicles such as hybrid vehicles (HV), plug-in hybrid vehicles (PHV), electric vehicles (EV).

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, embodiments according to the invention will be described with reference to drawings. Incidentally, a dimensional relationship (length, width, and thickness) in each of drawings does not reflect an actual dimensional relationship. Items that are necessary for carrying out embodiments of the invention (for example, a structure and a production method of an electrode body provided with a positive electrode and a negative electrode, a structure and a production method of a separator, a shape of a battery (case), general technology relating to a formation of a battery) other than items particularly referred to in the specification may be grasped as design matters of a person skilled in the art based on the related art in the concerned field. The embodiments of the invention may be carried out based on contents disclosed in the specification and common technical knowledge in the concerned field. Further, in the following drawings, like members and portions that show the same action will be represented with the like numbers, and duplicated description will be omitted or simplified.

Figure 1:
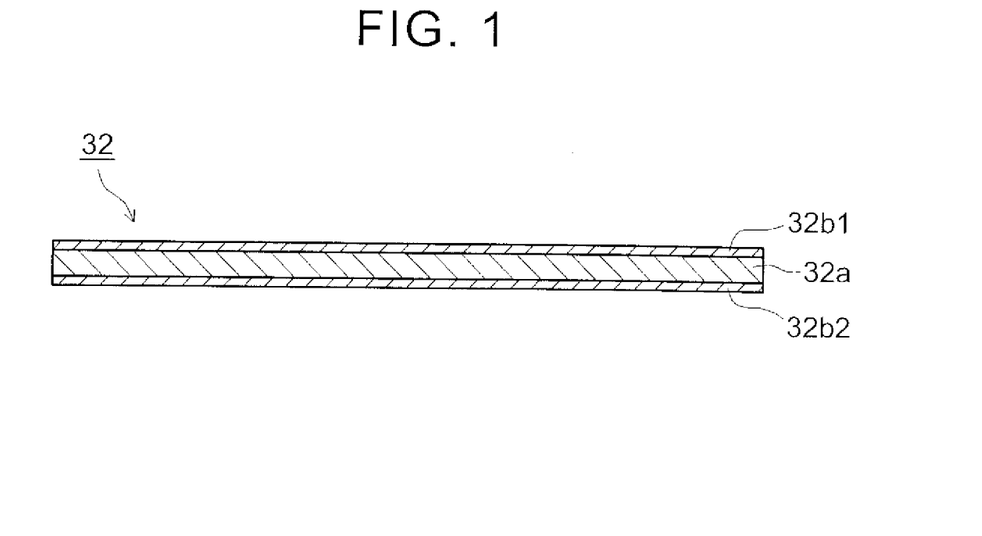
FIG. 1 is a cross-sectional view that schematically shows a current collector according to one embodiment.

In the current collector (positive electrode current collector) disclosed herein, as shown in FIG. 1 for example, surface layers 32$b$1 and 32$b$2 are disposed on both surfaces of a base material 32$a$. In other words, a current collector 32 includes surface layers 32$b$1 and 32$b$2 that form both surfaces of the current collector 32 and the base material 32$a$ positioned inside of the surface layers 32$b$1 and 32$b$2 in the thickness direction of the current collector 32. The surface layer is not necessarily disposed over an entirety of a surface of the base material like the embodiment. That is, the surface layer may be disposed at least on an exposed part after a positive electrode active material layer described below is formed on the current collector. Typically, the surface layer may be disposed at least on an active material layer non-formed part of the current collector and may not be disposed on an active material layer formed part of the current collector. Further, according to the above embodiment, an end face of the current collector is not covered with the surface layer. However, from a viewpoint of forming a good coat also on the end face, a material that forms the surface layer may be formed so as to cover the end face of the current collector.

The surface layer of the current collector is made of an aluminum material (Al material) of which Al content is 99.5% by mass or more. When the current collector is applied to a secondary battery, a good quality coat (typically, a coat of $Al_2O_3$ or $AlF_3$ (oxide film, fluoride film)) is formed on a surface of the current collector, and the battery capacity can be prevented from decreasing owing to high potential charge/discharge. The Al content is preferable to be 99.85% by mass or more (for example, 99.90% by mass or more, typically, 99.99% by mass or more). The "good quality coat" in the specification may be assumed that a coat has a uniform thickness, for example, and is high in the stability (non-reactivity) against a non-aqueous electrolytic solution. Further, the coat may be assumed a uniform coat less in impurity as the Al containing stable coat as described above.

The base material of the current collector is formed of a conductive material having the strength larger than that of the surface layer. The base material may be a material having the tensile strength larger than that of the surface layer, for example. The base material may be a material having the elongation larger than that of the surface layer, for example. Though not particularly limited, it is preferable that the base material has the tensile strength larger by 1 MPa or more (10 MPa or more, for example, 20 MPa or more, typically) than that of the surface layer. Further, the base material preferably has the elongation larger by 0.1% or more (0.5% or more, for example, 1% or more typically) than that of the surface layer. Measurements of the tensile strength and elongation may be performed by applying a method to the current collector described below to the surface layer and the base material.

As the conductive material that forms the base material, an Al material can be used, for example. Further, metals such as Ni, Fe, Cu, and Ti and alloys thereof may be used.

As the Al material, pure Al that is excellent in the electric conductivity, and also excellent in the corrosion resistance, and processability is preferable. The pure Al may typically include Al of 99% by mass or more and inevitable impurities. As the pure Al, Al having the Al content of 99.0% by mass or more and less than 99.85% by mass (for example, 99.2% by mass or more and 99.7% by mass or less, typically, 99.3.% by mass or more and 99.5% by mass or less) can preferably be used.

The Al material may be an Al alloy. As the Al alloys, for example, following Al alloys can be used: 2000 series Al alloy material that contains Cu as a main additive element and is excellent in the mechanical characteristics such as strength and cutting workability; 3000 series Al alloy material in which by adding Mn, while preventing the workability and corrosion resistance of pure Al from degrading, the strength is increased; 4000 series Al alloy material in which by adding Si, the thermal expansion is suppressed, and the wear resistance is improved; 5000 series Al alloy material in which by adding Mg, the corrosion resistance is prevented from degrading, and the strength and weldability are improved; 6000 series Al alloy material in which by adding Si and Mg, the strength and the corrosion resistance are improved; and 7000 series Al alloy material that is represented by an Al—Zn—Mg—Cu base alloy that has the highest strength among Al alloys and an Al—Zn—Mg alloy for welded structure, which does not contain Cu. The Al content in the Al alloy may be 50% by mass or more even when the composition does not conform to the above standard. However, when an increase in the internal resistance of the current collector is considered, a higher content of Al is preferable, and substantially, the Al content is preferably 90% by mass or more (for example, 93% by mass or more, typically, 95% by mass or more).

Although a thickness of the surface layer is not particularly restricted, from the viewpoint of forming a good quality coat on a surface of the surface layer, it is preferable to be at least 2 nm or more (for example, 4 nm or more, typically, 10 nm or more). The thickness of the surface layer is preferably set to about 1 to 15 μm (for example, 2 to 10 μm, typically, 3 to 7 μm) by considering the strength. Although also a thickness of the base material is not particularly restricted, by considering the electric conductivity and the strength, it is preferably set to about 1 to 30 μm (for example, 3 to 20 μm, typically, 5 to 15 μm). Although a thickness (total thickness) of the current collector is not particularly restricted, it is appropriate to set to about 8 to 50 μm (for example, 10 to 30 μm, typically, 12 to 20 μm). When the surface layer is partially disposed on a surface of the base material, the maximum thickness of the base material may be the same as a thickness of the current collector. The total thickness of the current collector, the thicknesses of the surface layer and the base material can be obtained by analyzing an image of a cross-section of the current collector taken by a SEM (Scanning Electron Microscope).

The current collector is preferably formed only of the surface layer and the base material from the viewpoint of combining the battery capacity and the strength and from the viewpoint of productivity. In this case, since the surface layer is present on both surfaces of the current collector, a three-layered structure made of two surface layers and one base material (base material layer) can be formed. On a surface of the laminated structure like this, a coat may further be formed inside the battery. Alternatively, the current collector may be provided with an optional additional layer between the surface layer and the base material (base material layer). A material of such a layer may be conductive and is not particularly restricted as long as it is conductive. For example, the conductive materials exemplified as materials that form the base material can preferably be used. Also a thickness of the layer is not particularly restricted and it can appropriately be set, depending on the object, within the range of the total thickness of the current collector.

As the strength of the current collector in the specification, for example, the tensile strength of the current collector is preferably 150 MPa or more (for example, 170 MPa or more, typically, 180 MPa or more). As a measurement method of the tensile strength, for example, the following method can be adopted. That is, a strip-formed measurement sample having a length of 180 mm and a width of 15 mm is prepared. Next, one end in a longer direction of the sample is fixed, and the other end in a longer direction is pulled at a speed of 5 mm/minute to add a load. Then, the maximum weight that the sample endured is measured, the measurement result is divided by a cross section area (width×thickness of the sample) orthogonal to a longer direction of the sample, and the tensile strength (MPa) is obtained thereby.

Further, the elongation of the current collector is preferably 1.0% or more (for example, 2% or more, typically, 3% or more). As a measurement method of the elongation, the following method can be adopted, for example. That is, a strip-formed measurement sample having a length of 180 mm and a width of 15 mm is prepared, in the vicinity of a center in a longer direction of the sample, two marks distanced by 50 mm in the longer direction (specifically, two lines in parallel in a width direction) are marked. Then, with one end of the sample in the longer direction fixed, by pulling the other end in the longer direction at a speed of 5 mm/minute, a load is applied. Then, a distance between the marks after the sample was broken is measured, a distance (mm) obtained by subtracting an initial distance between marked points (50 mm) from the measurement results (mm) is divided by an initial distance between marked points, and the elongation (%) is obtained thereby.

The current collector that has the base material and the surface layer such as described above is preferably a composite material (laminated material) in which a sheet-formed surface layer is laminated on both surfaces of a sheet-formed base material. Such a composite material is typically particularly preferable to be a clad material (preferably an Al clad material) in which the surface layer is cladded (overlay clad, edge-lay clad) on both surfaces of the base material. In the clad material like this, since the base material and the surface layer may be metallographically joined, while realizing a surface that can prevent the battery capacity from decreasing due to high potential charge/discharge, the current collector having sufficient strength can be obtained. A preparation method of the clad material is not particularly restricted, and a well-known method such as rolling and pressing under specified condition can appropriately be adopted.

Alternatively, the surface layer may be formed in such a manner that electrolytic plating is applied to the sheet-formed base material so as to form an electrolytic plating layer on both surfaces (at least an active material layer non-formed part of both surface) of the base material. Such an electrolytic plating method is not particularly restricted, and a well-known method can appropriately be adopted. For example, when an Al-containing electrolytic solution that uses a specified nonaqueous solvent (dialkyl sulfone such as dimethyl sulfone, for example) is electrolytically plated with high purity Al as a positive electrode and a base material as a negative electrode for a specified time (for example, 1 to 90 minutes, typically, 3 to 60 minutes) under a specified temperature condition (for example, 80 to 110° C., typically, 90 to 110° C.) and specified input current density condition (for example, 100 to 1000 A/m$^2$, typically, 100 to 500 A/m$^2$), an electrolytic plating layer (surface layer) can be formed. By processing under the above condition, a dense surface layer having the Al content of 99.85% by mass or more can efficiently be formed on the surface of the base material.

Alternatively, the surface layer can be formed also by performing a method such as a vapor deposition method such as a vacuum vapor deposition method (typically, sputtering method), a hot-dip coating treatment, a thermal spraying. Since this can be performed by adopting a well-known method, a particular description is not given herein. Further, the processing condition of the above method can appropriately be set in the range in which the Al content of the surface layer may be 99.85% by mass or more.

Next, as a preferable embodiment of a nonaqueous electrolytic solution secondary battery prepared with the current collector disclosed here, a lithium secondary battery is described as an example. However, it is not intended to limit an applicable target of the invention to the battery. For example, the invention can be applied also to a nonaqueous electrolytic solution secondary battery in which a metal ion (sodium ion, for example) other than a lithium ion (Li ion) is used as a charge carrier. Further, a "secondary battery" in the specification means generally a battery that can be repeatedly charged and discharged, and includes, other than a storage battery (that is, chemical battery) such as a lithium ion secondary battery, a capacitor (that is, a physical battery) such as an electric double layer capacitor. A "lithium secondary battery" in the specification means a secondary battery that by making use of a lithium ion as an electrolyte ion realizes charge/discharge by a transfer of charges accompanying Li ion between the positive electrode and the negative electrode. For example, also a secondary battery that uses together a metal ion (for example, sodium ion) other than a lithium ion as a charge carrier can be included in the "lithium ion secondary battery" in the specification. A battery that is generally called a lithium ion secondary battery is a typical example included in the lithium ion secondary battery in the specification.

Figure 2:
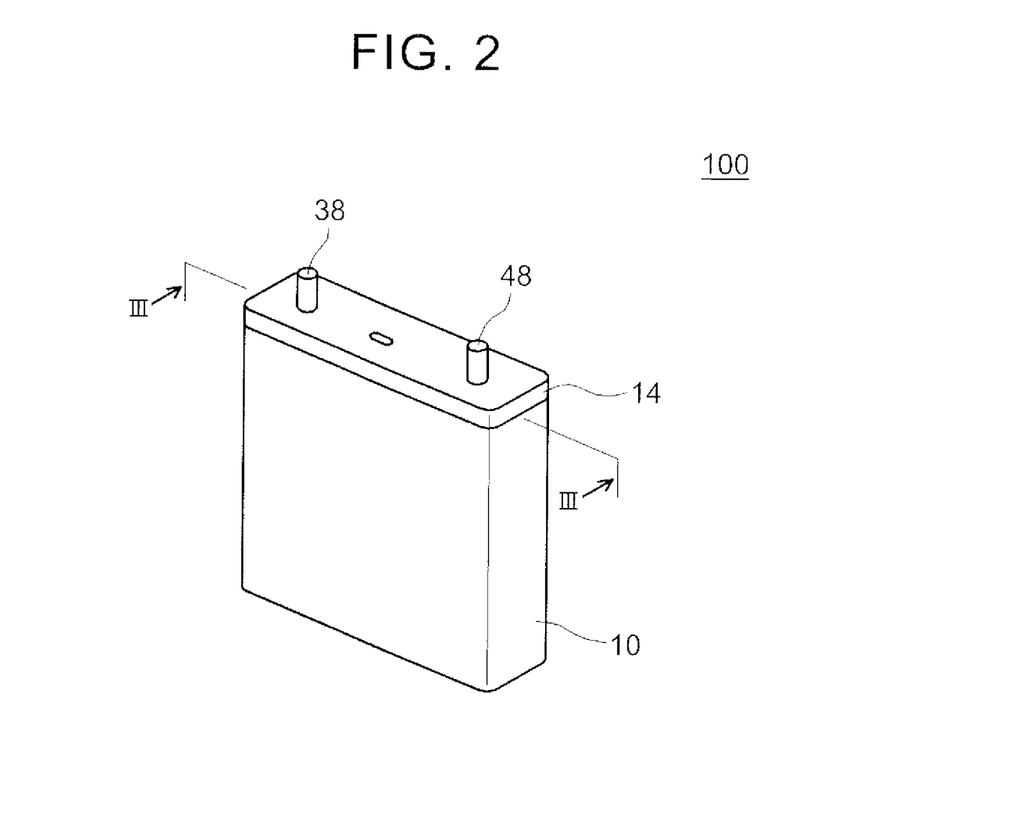
FIG. 2 is a perspective view that schematically shows an external shape of a lithium ion secondary battery according to the embodiment.
Figure 3:
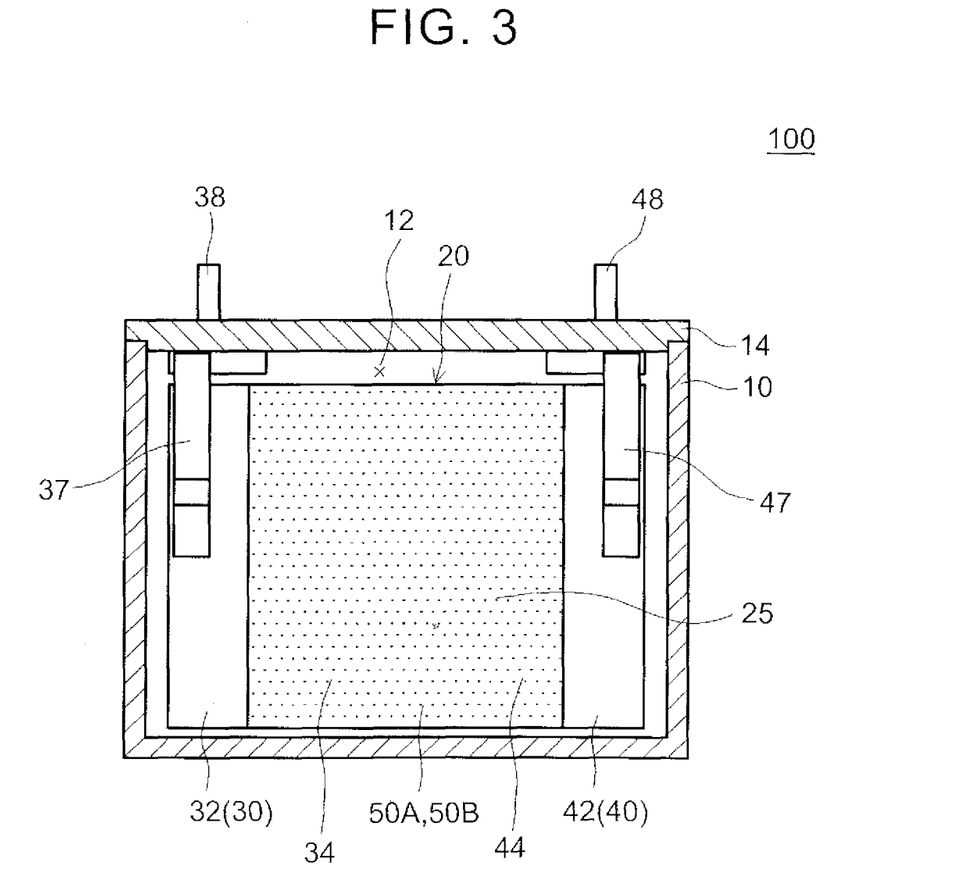
FIG. 3 is a cross-sectional view in a line III-III of FIG. 2.

As shown in FIG. 2 and FIG. 3, a lithium ion secondary battery 100 includes a rectangular box-shaped battery case 10 and a wound electrode body 20 housed in the battery case 10. The battery case 10 has an opening 12 on a top surface. The opening 12 is sealed with a cap body 14 after the wound electrode body 20 is housed in the battery case 10 from the opening 12. Also inside the battery case 10, a nonaqueous electrolytic solution 25 is housed. The cap body 14 is provided with an external positive electrode terminal 38 and an external negative electrode terminal 48, which are used for external connection, and parts of the terminals 38 and 48 protrude toward a surface side of the cap body 14. Further, a part of the external positive electrode terminal 38 is connected with an internal positive electrode terminal 37 inside the battery case 10, and a part of the external negative electrode terminal 48 is connected with an internal negative electrode terminal 47 inside the battery case 10.

Figure 4:
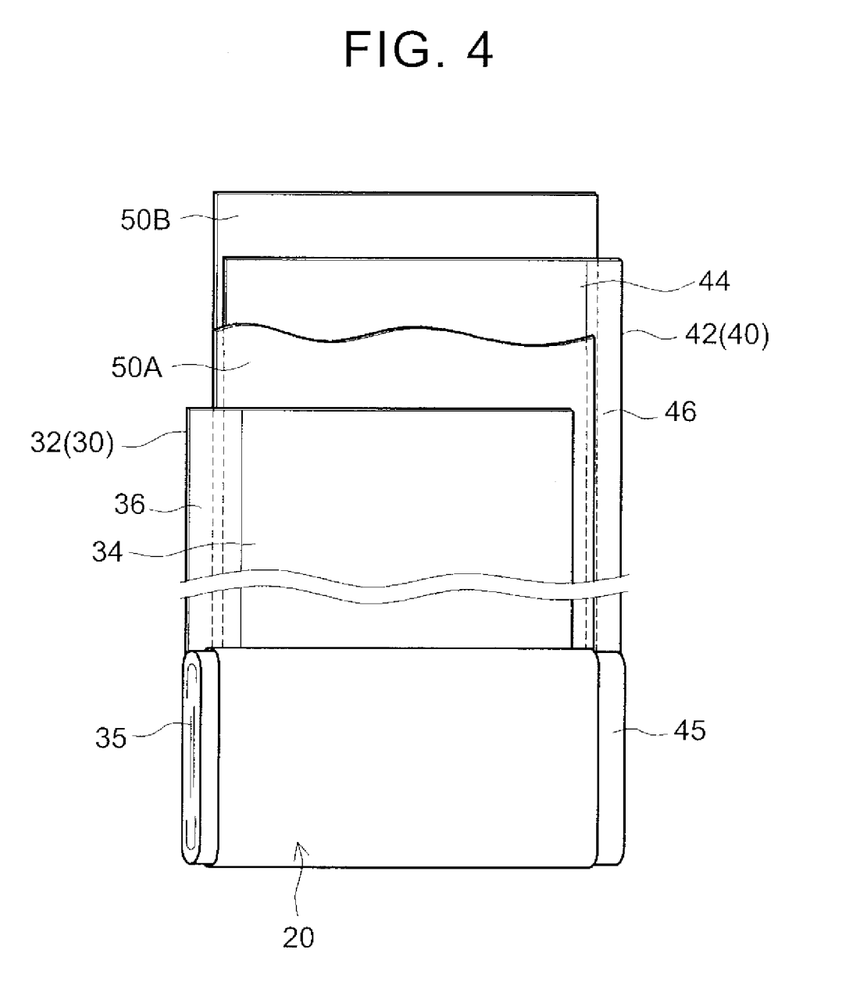
FIG. 4 is a perspective view that schematically shows a state where an electrode body according to the embodiment is prepared by winding.
Figure 5:
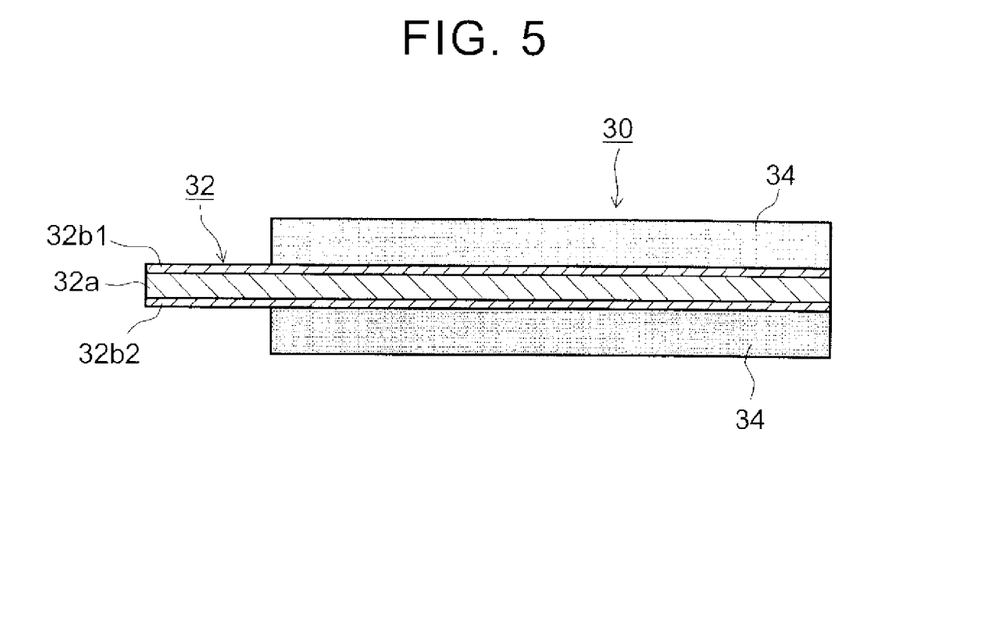
FIG. 5 is a schematic cross-sectional view that shows a positive electrode that forms the electrode body of FIG. 4 on larger scale.

As shown in FIG. 4, the wound electrode body 20 includes a long sheet-formed positive electrode (positive electrode sheet) 30 and a long sheet-formed negative electrode (negative electrode sheet) 40. The positive electrode sheet 30 includes a long positive electrode current collector 32 and a positive electrode active material layer 34 formed at least on one surface (typically, on both surfaces) thereof. The positive electrode current collector 32 is the positive electrode current collector described above and, as shown in FIG. 5, a composite material of a three-layered structure having the base material 32$a$ and the surface layers 32$b$1 and 32$b$2.

The negative electrode sheet 40 includes a long negative electrode current collector 42 and a negative electrode active material layer 44 formed at least on one surface (typically, on both surfaces) thereof. The wound electrode body 20 also includes two long sheet-formed separators (separator sheets) 50A and 50B. The positive electrode sheet 30 and the negative electrode sheet 40 are laminated through two separator sheets 50A and 50B in an order of the positive electrode sheet 30, the separator sheet 50A, the negative electrode sheet 40, and the separator sheet 50B. The laminate is formed into a wound body by winding in a long direction, further by bending the wound body by crushing from a side surface direction, and a flat shape is formed thereby. The wound electrode body like this is required to have strength more than a specified value since the current collector is deformed during preparation. The positive electrode current collector disclosed herein has, in spite of a high Al content, sufficient strength as the current collector for a flat-shaped wound electrode body and can preferably be applied to the wound electrode body. The electrode body is not restricted to the wound electrode body. According to a shape and purpose of use of the battery, a proper shape and structure such as a laminate type can appropriately be adopted.

In a center part in a width direction (a direction orthogonal to a winding direction) of the wound electrode body 20, a portion in which the positive electrode active material layer 34 and the negative electrode active material layer 44 overlap and are densely laminated is formed. The positive electrode active material layer 34 is formed on a surface of the positive electrode current collector 32, and the negative electrode active material layer 44 is formed on a surface of the negative electrode current collector 42. Further, in one end in a width direction of the positive electrode sheet 30, a portion (a positive electrode active material layer non-formed part 36) in which the positive electrode active material layer 34 is not formed and the positive electrode current collector 32 is exposed is disposed. The positive electrode active material layer non-formed part 36 is in a state where it is protruded from the separator sheets 50A and 50B and the negative electrode sheet 40. That is, in one end in a width direction of the wound electrode body 20, a positive electrode current collector laminated part 35 in which the positive electrode active material layer non-formed part 36 of the positive electrode current collector is superposed is formed. Further, also in the other end in a width direction of the wound electrode body 20, in the same manner as the case of the positive electrode sheet 30 in the one end, a negative electrode current collector laminated part 45 in which a negative electrode active material layer non-formed part 46 of the negative electrode current collector 42 is superposed is formed. The separator sheets 50A and 50B have a width that is larger than a width of a laminated part of positive electrode active material layer 34 and the negative electrode active material layer 44 and smaller than a width of the wound electrode body 20. When this is disposed by inserting in a laminated part of the positive electrode active material layer 34 and the negative electrode active material layer 44, the positive electrode active material layer 34 and the negative electrode active material layer 44 are prevented from coming into contact with each other and causing internal short circuit.

Next, each of constituents that form the lithium ion secondary battery will be described. As a positive electrode current collector that forms a positive electrode (a positive electrode sheet, for example) of the lithium ion secondary battery, the current collector described above is adopted. The positive electrode active material layer can include, in addition to the positive electrode active material, additives such as a conductive agent and a binder, as required.

The positive electrode active material that has an operating potential (vs. Li/Li$^+$) higher than that of a general lithium ion secondary battery (the upper limit of the operating potential is about 4.2 V) at least in a part of range among SOC (State of Charge) 0% to 100% is used. For example, the positive electrode active material of which upper limit operating potential (upper limit operating potential) is 4.5 V (vs. Li/Li$^+$) or more can preferably be used. In other words, the positive electrode active material having the maximum value of the operating potential in the SOC 0% to 100% of 4.5 V (vs. Li/Li$^+$) or more can preferably used. When the positive electrode active material like this is used, the lithium ion secondary battery in which the positive electrode operates at a potential higher than 4.5 V (vs. Li/Li$^+$) can be realized. The upper limit operating potential (vs. Li/Li$^+$) of the positive electrode active material is preferably higher than 4.5 V, and more preferably 4.6 V or more (for example, 4.7 V or more, typically, 4.8 V or more). Although the upper limit of the operating potential is not particularly restricted, it can be 5.5 V or less (for example, 5.3 V or less, typically, 5.2 V or less). In general, since the operating potential of the positive electrode active material between the SOC 0% to 100% is the highest in a range including the SOC 100%, usually, the upper limit (typically, whether it is 4.5 V or more or not) of the operating potential of the positive electrode active material can be grasped through the operating potential of the positive electrode active material in the SOC 100% (that is, full charged state). Further, in the specification, it is assumed that the operating potential of the positive electrode active material can be grasped as the operating potential of the positive electrode.

Herein, as the operating potential of the positive electrode active material, a value measured in the following manner can be adopted. That is, a three-electrode cell is constituted by a positive electrode that contains a positive electrode active material that is a measurement target as a working electrode (WE), metallic lithium as a counter electrode (CE), metallic lithium as a reference electrode (RE) and an electrolytic solution. The electrolytic solution contains about 1 mol/L of LiPF$_6$ in a mixed solvent of ethylene carbonate (EC): dimethyl carbonate (DMC)=30:70 (volume base). The SOC value of the cell is controlled by 5% increment from SOC 0% to SOC 100% based on a theoretical capacity of the cell. The SOC control can be performed by conducting a constant current charge between the WE and CE using a general charge/discharge device or a potentiostat. After cells are controlled to the respective SOC values and left for 1 hour, by measuring a potential between the WE and RE, the potential may be taken as an operating potential (vs. Li/Li$^+$) of the positive electrode active material in the SOC value.

As the positive electrode active material, one or more kinds of various materials that are known as usable as the positive electrode active material of the lithium ion secondary battery can be used without particular restriction. The positive electrode active material is typically particles having an average particle size of about 1 to 20 μm (2 to 10 μm, for example). The "average particle size" in the specification, unless clearly stated otherwise, indicates a median diameter ($D_{50}$) in a particle size distribution based on volume which is obtained by a general laser diffraction particle size distribution measurement device. As the positive electrode active material, a lithium transition metal composite oxide that has a spinel structure or a layered structure and contains, for example, lithium (Li) and at least one kind of transition elements as a constituent metal element, and a polyanion type (olivine type, for example) lithium transition metal composite oxide may be used.

As the lithium transition metal composite oxide having a spinel structure, for example, lithium manganese composite oxide that contains at least Mn as a transition element and has a spinel structure can be used. More specifically, lithium manganese composite oxide that is represented by a formula: $Li_pMn_{2-q}M_qO_{4+\alpha}$, and has a spinel structure can be used. Herein, p is 0.9≤p≤1.2; q is 0≤q<2, typically 0≤q≤1 (0.2≤q≤0.6); and α is −0.2≤α≤0.2, and these are values determined so that a charge-neutral condition is satisfied. When q is larger than 0 (0<q), M may be one or two or more kinds selected from optional metal elements or non-metal elements other than Mn. More specifically, M may be Na, Mg, Ca, Sr, Ti, Zr, V, Nb, Cr, Mo, Fe, Co, Rh, Ni, Pd, Pt, Cu, Zn, B, Al, Ga, In, Sn, La, W and Ce. Among these, at least one kind of the transition metal elements such as Fe, Co, and Ni can preferably be adopted. As specific examples, $LiMn_2O_4$ and $LiCrMnO_4$ can be used.

As a particularly preferable mode, a compound in which M in the formula contains at least Ni (lithium nickel manganese composite oxide) can be used. More specifically, lithium nickel manganese composite oxide that is represented by a formula $Li_x(Ni_yMn_{2-y-z})M^1{}_zO_{4+\beta}$ and has a spinel structure can be used. Herein, $M^1$ may be an optional transition metal element other than Ni and Mn or a typical metal element (for example, one or two or more kinds selected from Fe, Co, Cu, Cr, Zn and Al). In particular, $M^1$ preferably contains at least one of trivalent Fe and Co. Alternatively, $M^1$ may be a semimetal element (for example, one or two or more kinds selected from B, Si and Ge) or a non-metal element. Further, x is $0.9 \leq x \leq 1.2$; y is $0<y$; z is $0 \leq z$; $y+z<2$ (typically, $y+z<1$); and β is the same as the α. According to a preferable mode, y is $0.2 \leq y \leq 1.0$ (more preferably, $0.4 \leq y \leq 0.6$, for example $0.45 \leq y \leq 0.55$); and z is $0 \leq z<1.0$ (for example, $0 \leq z<0.3$). As a specific example, $LiNi_{0.5}Mn_{1.5}O_4$ can be used. When the above composition is obtained, a positive electrode potential at the time of charge end can be made higher (typically, a higher potential than 4.5 V (vs. $Li/Li^+$)), that is, a 5 V class lithium ion secondary battery can be formed. The compound having the above composition is also excellent in the endurance. Whether the compound (oxide) has a spinel structure or not can be determined by X-ray structural analysis (preferably, single crystal X-ray structural analysis). More specifically, a measurement that uses an X-ray diffractometer (for example, "single crystal automatic X-ray structural analyzer" manufactured by Rigaku Corporation) with Cu Kα line (wavelength: 0.154051 nm) can determine it.

Alternatively, the positive electrode active material may be compounds described below. (1) Lithium transition metal composite oxide that is represented by a formula $LiMO_2$ and typically has a layered structure. Herein, M contains at least one kind of transition metal elements such as Ni, Co and Mn and may further contain other metal element or non-metal element. Specific examples include $LiNiO_2$ and $LiNi_{1/3}Co_{1/3}Mn_{1/3}O_2$. (2) Lithium transition metal composite oxide represented by a formula $Li_2MO_3$. Herein, M contains at least one kind of transition metal elements such as Mn, Fe, and Co and may further contain other metal element or non-metal element. Specific examples include $Li_2MnO_3$ and $Li_2PtO_3$. (3) Lithium transition metal compound (phosphate) represented by a formula $LiMPO_4$. Herein, M contains at least one kind of transition metal elements such as Mn, Fe, Ni and Co and may further contain other metal element or non-metal element. Specific examples include $LiMnPO_4$ and $LiFePO_4$. (4) Lithium transition metal compound (phosphate) represented by a formula $Li_2MPO_4F$. Herein, M contains at least one kind of transition metal elements such as Mn, Ni, and Co and may further contain other metal element or non-metal element. Specific examples include $LiMnPO_4F$. (5) Solid solution between $LiMO_2$ and $Li_2MO_3$. Herein, $LiMO_2$ indicates a composition represented by the formula (1), and $Li_2MO_3$ indicates a composition represented by the formula (2). Specific examples include a solid solution represented by $0.5LiNi_{1/3}Mn_{1/3}CO_{1/3}O_2$-$0.5Li_2MnO_3$.

The positive electrode active materials described above may be used alone or in a combination of two or more kinds. Among these, the positive electrode active material preferably contains the lithium manganese composite oxide having the spinel structure (preferably, lithium nickel manganese composite oxide) at a ratio of 50% by mass or more (typically, 50 to 100% by mass, for example, 70 to 100% by mass, preferably, 80 to 100% by mass) in a total positive electrode active material used. The positive electrode active material is preferable to be substantially formed of lithium manganese composite oxide (preferably, lithium nickel manganese composite oxide) having a spinel structure.

The lithium transition metal composite oxide (layered compound) having a layered structure collapses in its crystal structure when a potential becomes higher than 4.5 V (vs. $Li/Li^+$), a transition metal (for example, Mn) that forms a compound tends to gradually elute in the electrolytic solution. Therefore, when charge/discharge is repeated, the battery capacity gradually decreases, and endurance may be degraded. From such a viewpoint, as another preferable mode, the positive electrode active material may substantially not contain the layered compound. More specifically, a ratio of the layered compound in the entire positive electrode active material is 5% by mass or less, typically 2% by mass or less, and preferably 1% by mass or less (more preferably, 0.1% by mass or less).

As the conductive material, various carbon materials can preferably be used. For example, one kind or two or more kinds selected from carbon materials such as various carbon blacks, cokes, activated carbon, graphite (natural graphite, artificial graphite), carbon fiber, carbon nanotube, fullerene and graphene can be used. Among these, carbon black (typically, acetylene black (AB)) that has a relatively small particle size and a large specific surface area can preferably be used. Alternatively, metal powders of Cu and Ni and an organic conductive material such as a polyphenylene derivative can be used. These can be used alone or as a mixture of two or more kinds.

As the binder, various kinds of polymers can be used. For example, when the positive electrode active material layer is formed using an aqueous composition, an aqueous or water-dispersible polymer material can preferably be adopted as the binder. As the aqueous or water-dispersible polymer materials, cellulose-based polymers such as carboxymethylcellulose (CMC); polyvinyl alcohol (PVA); fluororesins such as polytetrafluoroethylene (PTFE); vinyl acetate polymer; rubbers such as styrene butadiene rubber (SBR), and acrylic acid-modified SBR resin (SBR-based latex) can be examples. Alternatively, when the positive electrode active material layer is formed using a solvent-based composition, polymer materials such as halogenated vinyl resins such as polyvinylidene fluoride (PVdF) and polyvinylidene chloride (PVdC); polyalkylene oxide such as polyethylene oxide (PEO) can be used. The binders like these can be used alone or in a combination of two or more kinds. The above-exemplified polymer materials may be used other than the binder as an additive such as a thickener of the positive electrode active material layer-forming composition and other.

A ratio of the positive electrode active material in the positive electrode active material layer exceeds about 50% by mass and is preferably about 70 to 97% by mass (for example, 75 to 95% by mass). Further, although a ratio of the additive in the positive electrode active material layer is not particularly restricted, a ratio of the conductive agent is preferably set to about 1 to 20 parts by mass (for example, 2 to 15 parts by mass, typically, 3 to 12 parts by mass) with respect to 100 parts by mass of the positive electrode active material. A ratio of the binder is preferably set to about 0.8 to 10 parts by mass (for example, 1 to 7 parts by mass, typically, 2 to 5 parts by mass) with respect to 100 parts by mass of the positive electrode active material.

A basis weight per unit area of the positive electrode active material layer on the positive electrode current collector (a coated amount of the positive electrode active material layer-forming composition in terms of the solid content) is not particularly restricted. On the other hand, the basis weight is preferably set to 3 $mg/cm^2$ or more (for example, 5 $mg/cm^2$ or more, typically, 6 $mg/cm^2$ or more) and 45 $mg/cm^2$ or less (for example, 28 $mg/cm^2$ or less, typically, 15 $mg/cm^2$ or less) per one surface of the positive electrode current collector from the viewpoint of securing a sufficient conductive route (conduction path).

As the negative electrode current collector that forms the negative electrode (for example, a negative electrode sheet), in the same manner as the lithium ion secondary battery of the related art, a conductive member made of a metal having excellent conductivity can preferably be used. As such a conductive member, for example, copper or an alloy that contains copper as a main component may be used. A shape of the negative electrode current collector is not particularly restricted because it can be different depending on a shape of the battery, that is, various shapes such as rod-shape, plate-shape, sheet-form, foil-form, mesh-form can be taken. Also a thickness of the negative electrode current collector is not particularly restricted and may be about 5 to 30 μm, for example.

The negative electrode active material layer contains a negative electrode active material that can store and release a Li ion that is a charge carrier. A composition and a shape of the negative electrode active material are not particularly restricted, and one kind or two or more kinds of materials used in the lithium ion secondary battery from the related art can be used. The negative electrode active material may typically be particles having an average particle size of about 1 to 40 μm (8 to 25 μm, for example). As such negative electrode active material, for example, a carbon material generally used in the lithium secondary battery can be used. Typical examples of the carbon materials include graphite carbon (graphite) and amorphous carbon. A particulate carbon material (carbon particles) that at least partially contains a graphite structure (layered structure) is preferably used. Among these, a carbon material that contains natural graphite as a main component is preferably used. The natural graphite may be obtained by spheroidizing flake-form graphite. Further, a carbonaceous powder in which amorphous carbon is coated on a surface of graphite may be used. Other than the above, as the negative electrode active material, oxide such as lithium titanate, a simple substance such as a silicon material and tin material, an alloy, a compound and a composite material obtained by using these materials together can be used. Among these, in particular, the negative electrode active material having a reduction potential (vs. $Li/Li^+$) of about 0.5 V or less (for example, 0.2 V or less, typically, 0.1 V or less) is preferably used. When the negative electrode active material having the reduction potential described above is used, a high energy density can be realized. As a material that can have such a low potential, a graphite-based carbon material (typically, graphite particles) can be used. A ratio of the negative electrode active material in the negative electrode active material layer exceeds about 50% by mass and is preferably about 90 to 99% by mass (for example, 95 to 99% by mass, typically, 97 to 99% by mass).

The negative electrode active material layer may contain, as required, other than the negative electrode active material, one kind or two or more kinds of binders and thickeners that are blended in the negative electrode active material layer of the general lithium secondary battery and other additives. As the binder, various kinds of polymers can be used. For example, for an aqueous composition or a solvent-based composition, the binders that can be contained in the positive electrode active material layer can preferably be used. The binder like this, other than being used as the binder, may be used as an additive such as the thickener of the negative electrode active material layer-forming composition and so forth. Although a ratio of the additive in the negative electrode active material layer is not particularly restricted, it is preferable to be about 0.8 to 10% by mass (for example, about 1 to 5% by mass, typically, 1 to 3% by mass).

A basis weight (a coated amount in terms of a solid content of the negative electrode active material layer-forming composition) per unit area of the negative electrode active material layer on the negative electrode current collector is not particularly restricted. The basis weight is preferably set to 2 $mg/cm^2$ or more per one surface of the negative electrode current collector (for example, 3 $mg/cm^2$ or more, typically, 4 $mg/cm^2$ or more) and 40 $mg/cm^2$ or less (for example, 22 $mg/cm^2$ or less, typically, 10 $mg/cm^2$ or less), from the viewpoint of securing a sufficient conductive route (conduction path).

The separator (separator sheet) that is disposed so as to separate the positive electrode from the negative electrode may be a member that insulates the positive electrode active material layer from the negative electrode active material layer and allows an electrolyte to migrate. As a preferable example of the separator, a separator made of a porous polyolefin resin can be used. For example, a porous separator sheet made of a synthetic resin (for example, polyethylene (PE), polypropylene (PP) or polyolefin having a two or more layered structure by combining these) having a thickness of about 5 to 30 μm can preferably be used. The separator sheet may be provided with a heat resistance layer. Incidentally, for example, when a solid (gelatinous) electrolyte obtained by adding a polymer to the electrolytic solution is used in place of the nonaqueous electrolytic solution, the separator may be unnecessary since the electrolyte itself can function as the separator.

As a typical example of the nonaqueous electrolytic solution that is poured in the lithium secondary battery, an electrolytic solution having a composition in which a support salt is contained in a proper nonaqueous solvent can be used. Examples of the nonaqueous solvents include ethylene carbonate (EC), propylene carbonate (PC), diethyl carbonate (DEC), dimethyl carbonate (DMC), ethyl methyl carbonate (EMC), 1,2-dimethoxyethane, 1,2-diethoxyethane, tetrahydrofuran, 2-methyltetrahydrofuran, dioxane, 1,3-dioxolan, diethylene glycol dimethyl ether, ethylene glycol dimethyl ether, acetonitrile, propionitrile, nitromethane, N,N-dimethyl formamide, dimethyl sulfoxide, sulfolane, and γ-butyrolactone. Further, fluorinated carbonate such as monofluoroethylene carbonate (MFEC) and difluoroethylene carbonate (DFEC) can preferably be used. These can be used alone or in a combination of two or more kinds. Among these, EC, DMC, and EMC are preferred.

As the support salt, one or two or more kinds of lithium compounds (lithium salts) such as $LiPF_6$, $LiBF_4$, $LiClO_4$, $LiAsF_6$, $LiCF_3SO_3$, $LiC_4F_9SO_3$, $LiN(CF_3SO_2)_2$, $LiC(CF_3SO_2)_3$, and LiI can be used. Although a concentration of the support salt is not particularly restricted, it may be a concentration of about 0.1 to 5 mol/L (for example, 0.5 to 3 mol/L, typically, 0.8 to 1.5 mol/L).

The nonaqueous electrolytic solution may contain an optional additive as required in a range that does not largely depart from an object of the invention. The additive can be used with an object of improving output performance of the battery, improving storability (suppression of capacity decrease during storage), improving the cycle characteristics, and improving the initial charge/discharge efficiency. Examples of preferable additives include fluorophosphates (preferably, difluorophosphate, for example, lithium difluorophosphate represented by $LiPO_2F_2$) and lithium bisoxalatoborate (LiBOB) can be used. Further, for example, additives such as cyclohexyl benzene and biphenyl that can be used for a measure against overcharge can be used.

A target of application of the technology disclosed herein is a nonaqueous electrolytic solution secondary battery (typically a lithium ion secondary battery) that uses a positive electrode operating at a high potential of 4.5 V (vs. $Li/Li^+$) or more. In the secondary battery that can be charged/discharged at such a potential, the excellent coat formed on the surface of the positive electrode current collector disclosed herein can suppress Al from eluding from the current collector. As a result, in the secondary battery that can perform high potential charge/discharge as described above, an increase in the electrical resistance can be suppressed and a decrease in the battery capacity can be suppressed.

Figure 6:
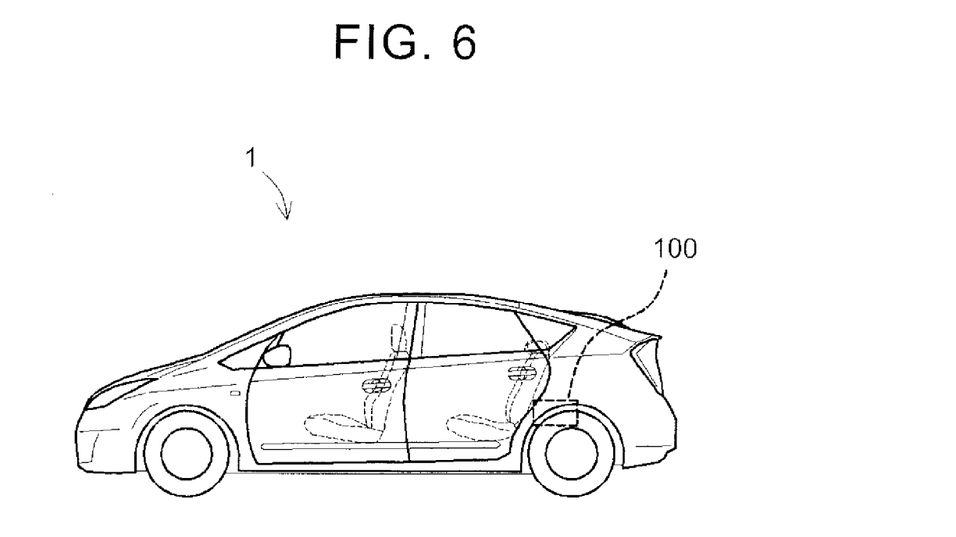
FIG. 6 is a side view that schematically shows a vehicle (automobile) provided with a lithium ion secondary battery according to the embodiment.

As described above, in the lithium ion secondary battery disclosed herein, a decrease in the battery capacity caused by the high potential charge/discharge of 4.5 V or more is suppressed, and the current collector has sufficient strength. Therefore, the lithium ion secondary battery disclosed herein can be used as a secondary battery for various kinds of applications. For example, as shown in FIG. 6, the lithium ion secondary battery 100 is mounted on a vehicle 1 such as an automobile and can preferably be used as a power source for driving a motor that drives the vehicle 1. Therefore, embodiments of the invention can provide the vehicle 1 (typically, a vehicle provided with a motor such as an automobile, particularly, a hybrid vehicle (HV), a plug-in hybrid vehicle (PHV), an electric vehicle (EV), and a fuel cell vehicle) provided with the lithium ion secondary battery (typically, a pack battery in which a plurality of lithium ion secondary batteries are connected in series) 100 as a power source.

Next, some examples relating to the invention will be described. However, it is not intended to limit the invention to examples. In the description below, "parts" and "%" are based on mass unless clearly stated otherwise.

Hereinafter, example 1 will be described. First, preparation of a positive electrode current collector will be described. As the base material, an Al sheet (A3003, Al content: 96.85%) was prepared. Further, as the surface layer, two Al sheets (A 1085, Al content: 99.85%) were prepared. A positive electrode current collector according to Example 1 was obtained by rolling and pressing the base material and two surface layers, in a state where the base material and two surface layers were superposed so that the two surface layers sandwich the base material, so that the base material and the surface layers were cladded and a total thickness was 15 μm. As thicknesses of the respective layers of the positive electrode current collector, thicknesses of both surface layers were about 4 μm and the thickness of the base material was about 7 μm. Kinds of the base material and the surface layer and Al content are shown in Table 1.

Next, preparation of a positive electrode sheet will be described. $LiNi_{0.5}Mn_{1.5}O_4$ powder (NiMn spinel) as the positive electrode active material, AB as the conductive material, and PVdF as the binder were mixed with N-methyl-2-pyrolidone so that a mass ratio of these materials was 87:10:3, and a pasty composition for forming a positive electrode active material layer was prepared thereby. The composition was uniformly coated on the positive electrode current collector. The coating matter was dried and pressed, and the positive electrode sheet was obtained.

Next, preparation of a negative electrode sheet will be described. Natural graphite material (average particle size: 20 μm, lattice constant $C_0$: 0.67 nm, crystal thickness Lc in a c-axis direction: 27 nm) as the negative electrode active material, SBR as the binder, and CMC as the thickener were mixed with water so that a mass ratio of these materials was 98:1:1, and a pasty composition for forming a negative electrode active material layer was prepared. The composition was uniformly coated on a copper foil (thickness: 15 μm). At this time, the coated amount was adjusted so that a ratio of theoretical capacity of the negative electrode: a theoretical capacity of the positive electrode was 1:1.5. The coating matter was dried and pressed and the negative electrode sheet was obtained.

Next, formation of a lithium ion secondary battery will be described. Each of the positive electrode sheet and the negative electrode sheet prepared as shown above was cut in a 4.4 cm square with a tab, the active material layer of the tab part was peeled, and a lead with a seal was attached. By superposing the positive electrode sheet and the negative electrode sheet through the separator sheet, an electrode body was prepared. As the separator sheet, a separator sheet having a three-layered structure made of PP/PE/PP (thickness: 20 μm) was used. The electrode body was housed in a bag made of an aluminum laminated film and a nonaqueous electrolytic solution was poured in the bag. As the nonaqueous electrolytic solution, an electrolyte solution obtained by dissolving about 1 mol/L of $LiPF_6$ as a support salt in a 30:70 (by volume ratio) mixed solvent of EC and EMC was used. While vacuuming the inside of the bag, the aluminum laminated film and the seal part attached to the lead were heat welded to seal (hermetically seal) the inside, and a laminate battery having capacity of 60 mAh was prepared.

Lithium secondary batteries according to examples 2 to 4 were prepared in the same manner as example 1 except that the base material and the surface layer of the positive electrode current collector were changed to ones shown in Table 1.

Lithium secondary batteries according to examples 5 to 8 were prepared in the same manner as example 1 except that materials (thickness: 15 μm) shown in Table 1 were used as the positive electrode current collector.

Hereinafter, a capacity retention rate after 500 cycles will be described. To each of the above-obtained batteries, after constant current (CC) charge was conducted at a rate of 1/5 C at 25° C. up to 4.9 V, constant voltage (CV) charge was conducted until a current value became 1/50 C, and a full-charged state was obtained. Thereafter, the CC discharge was conducted at a rate of 1/5 C up to 3.5 V, a capacity at this time was taken as an initial discharge capacity. Then, an operation in which, under a temperature environment of 40° C., CC discharge is conducted at the same rate up to 3.5 V after CC discharge of 2 C was conducted up to 4.9 V, was defined as one cycle and the operation was repeated 500 cycles. Thereafter, a discharge capacity was measured in the same manner as the initial discharge capacity. A capacity retention rate (%) after 500 cycles was obtained by dividing the discharge capacity after 500 cycles by the initial discharge capacity. Obtained results are shown in Table 1.

TABLE 1

| | Current collector material (Al Content %) | | Capacity retention rate (%) |
|---|---|---|---|
| | Base material | Surface layer | |
| Example 1 | A3003 (96.85%) | A1085 (99.85%) | 58 |
| Example 2 | A3003 (96.85%) | AlN99 (99.99%) | 57 |
| Example 3 | AlN30 (99.30%) | AlN99 (99.99%) | 61 |
| Example 4 | A3003 (96.85%) | AlN30 (99.30%) | 46 |
| Example 5 | A3003 (96.85%) | | 47 |
| Example 6 | AlN30 (99.30%) | | 44 |
| Example 7 | A1085 (99.85%) | | 59 |
| Example 8 | AlN99 (99.99%) | | 57 |

As shown in Table 1, from results of examples 5 to 8, a tendency that the higher the Al content that forms the current collector was, the higher the capacity retention rate was found. Further, in examples 1 to 4 where the current collector was formed into a composite structure, it was recognized that the higher the Al content of the surface layer was, the higher the capacity retention rate was. In particular, when examples 1 to 3, 7 and 8 in which the Al content of the surface layer was 99.5% or more and examples 4 to 6 in which the Al content was less than 99.5% were compared, a large difference in the capacity retention rate was recognized. It is considered because the Al content of the current collector surface became higher, an excellent stable coat that contains Al was formed on the current collector surface, and Al was suppressed from eluding from the current collector. On the other hand, an increase in the Al content is likely to cause a decrease in the strength. Therefore, in examples of the invention, as the surface layer of the current collector, a material having high Al content is adopted, and a material excellent in the strength is adopted as the base material. Therefore, in a secondary battery that uses a positive electrode active material that has an operating potential of 4.5 V or more, a decrease in the battery capacity caused by high potential charge/discharge can be prevented from occurring, and a current collector that has sufficient strength as the current collector for secondary battery can be realized. Further, by using the current collector, a nonaqueous electrolytic solution secondary battery suitable for high potential charge/discharge application can be formed.

Although, in the above, specific examples of the invention were described in detail, these are only exemplifications and do not limit the invention. The invention can include various modifications and alterations of the specific examples described above.

What is claimed is:

1. A nonaqueous electrolytic solution secondary battery comprising an electrode body that contains a positive electrode and a negative electrode, wherein
   an upper limit operating potential of the positive electrode is 4.5 V or more based on metallic lithium,
   the positive electrode includes a current collector and an active material layer formed on the current collector,
   the current collector includes a base material and a surface layer disposed on a surface of the base material,
   the surface layer is disposed at least in a region where the active material layer is not formed on the surface of the base material,
   the surface layer is formed of an aluminum material having an aluminum content of 99.85% by mass or more,
   the base material is formed of a conductive material having strength larger than strength of the surface layer,
   the conductive material that forms the base material is an aluminum material, and
   the aluminum material that forms the base material has an aluminum content lower than the aluminum content of the aluminum material that forms the surface layer.

2. The nonaqueous electrolytic solution secondary battery according to claim 1, wherein the current collector is a clad material.

3. The nonaqueous electrolytic solution secondary battery according to claim 1, wherein
   the positive electrode includes a lithium transition metal composite oxide having a spinel structure as a positive electrode active material, and
   the lithium transition metal composite oxide includes at least nickel and manganese as transition metal elements.

4. The nonaqueous electrolytic solution secondary battery according to claim 1, wherein
   both the positive electrode and the negative electrode have a sheet form, and
   the electrode body is a wound electrode body obtained by winding the positive electrode and the negative electrode.

5. The nonaqueous electrolytic solution secondary battery according to claim 1, wherein tensile strength of a material that forms the base material is larger by 1 MPa or more than tensile strength of a material that forms the surface layer.

6. The nonaqueous electrolytic solution secondary battery according to claim 1, wherein elongation of a material that forms the base material is larger by 0.1% or more than elongation of a material that forms the surface layer.

7. The nonaqueous electrolytic solution secondary battery according to claim 1, wherein the upper limit operating potential is 5.5 V or less.

8. A vehicle comprising the nonaqueous electrolytic solution secondary battery according to claim 1.

9. A current collector that is used in a positive electrode of which upper limit operating potential is 4.5 V or more based on metallic lithium, comprising:
   a base material; and
   a surface layer disposed on a surface of the base material, wherein
   the surface layer is formed of an aluminum material of which aluminum content is 99.85% by mass or more,
   the base material is formed of a conductive material of which strength is larger than strength of the surface layer,
   the conductive material that forms the base material is an aluminum material, and
   the aluminum material that forms the base material has an aluminum content lower than the aluminum content of the aluminum material that forms the surface layer.

10. The current collector according to claim 9, wherein the surface layer is disposed in a region on the surface of the base material to be an active material layer non-formed part, the active material layer non-formed part not including an active material layer.

11. The current collector according to claim 9, wherein tensile strength of a material that forms the base material is larger by 1 MPa or more than tensile strength of a material that forms the surface layer.

12. The current collector according to claim 9, wherein elongation of a material that forms the base material is larger by 0.1% or more than elongation of a material that forms the surface layer.

* * * * *